No. 671,368.  
P. BROWN.  
DRAFT MECHANISM.  
(Application filed Jan. 24, 1900.)  
Patented Apr. 2, 1901.
(No Model.) 2 Sheets—Sheet 1.
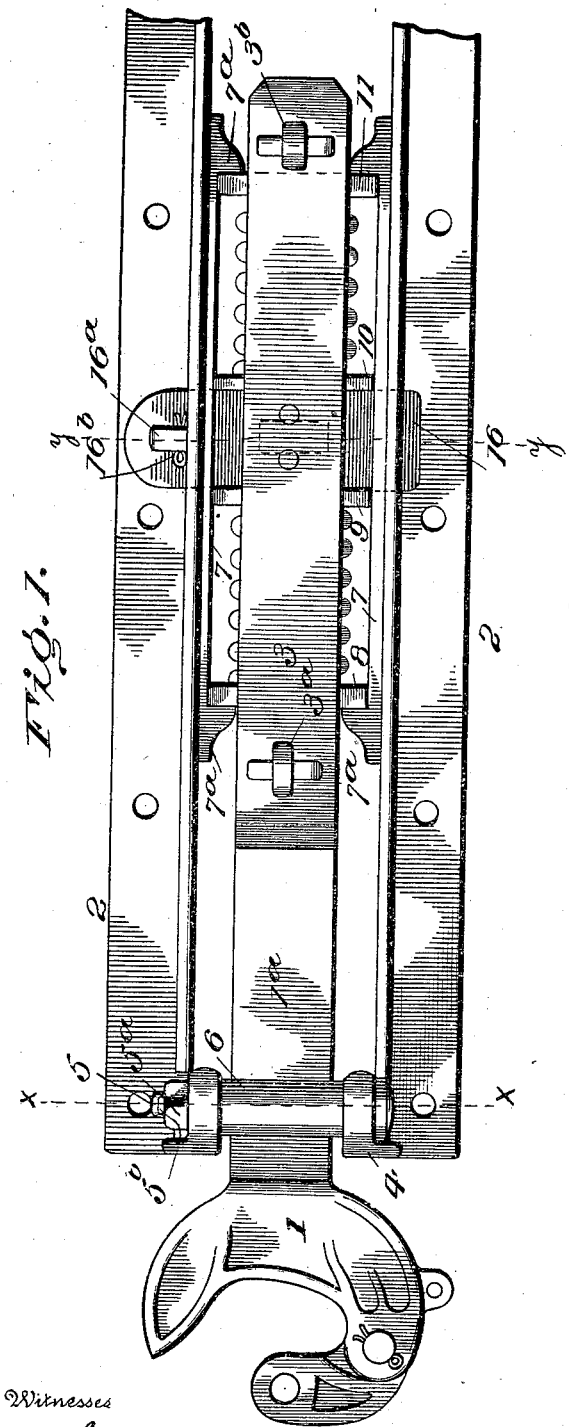
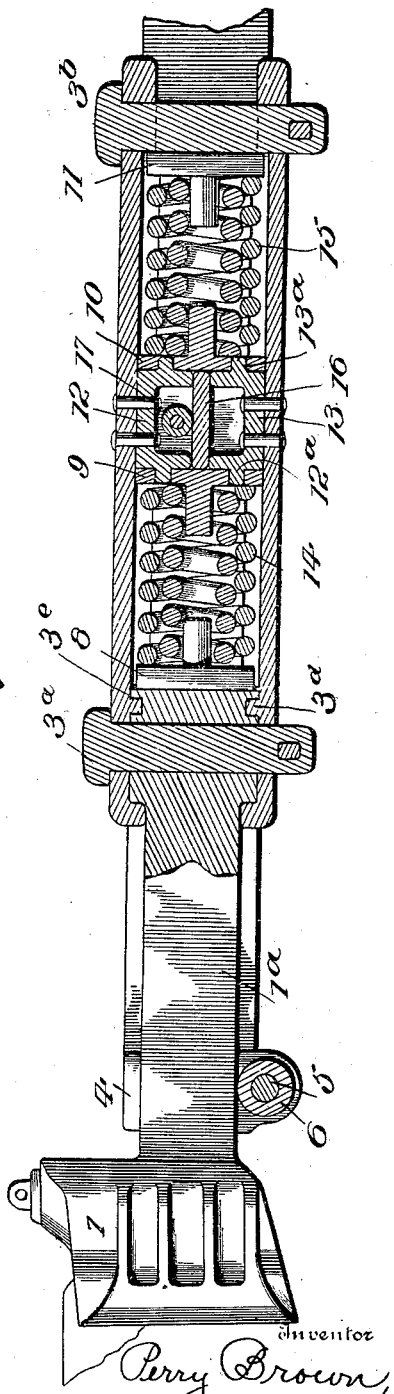
Witnesses  
Inventor  
Perry Brown,  
By Thos. E. Robertson  
Attorney No. 671,368.　　　　　　　　　　　　　　　Patented Apr. 2, 1901.
P. BROWN.
DRAFT MECHANISM.
(Application filed Jan. 24, 1900.)
(No Model.)　　　　　　　　　　　　　　　2 Sheets—Sheet 2.
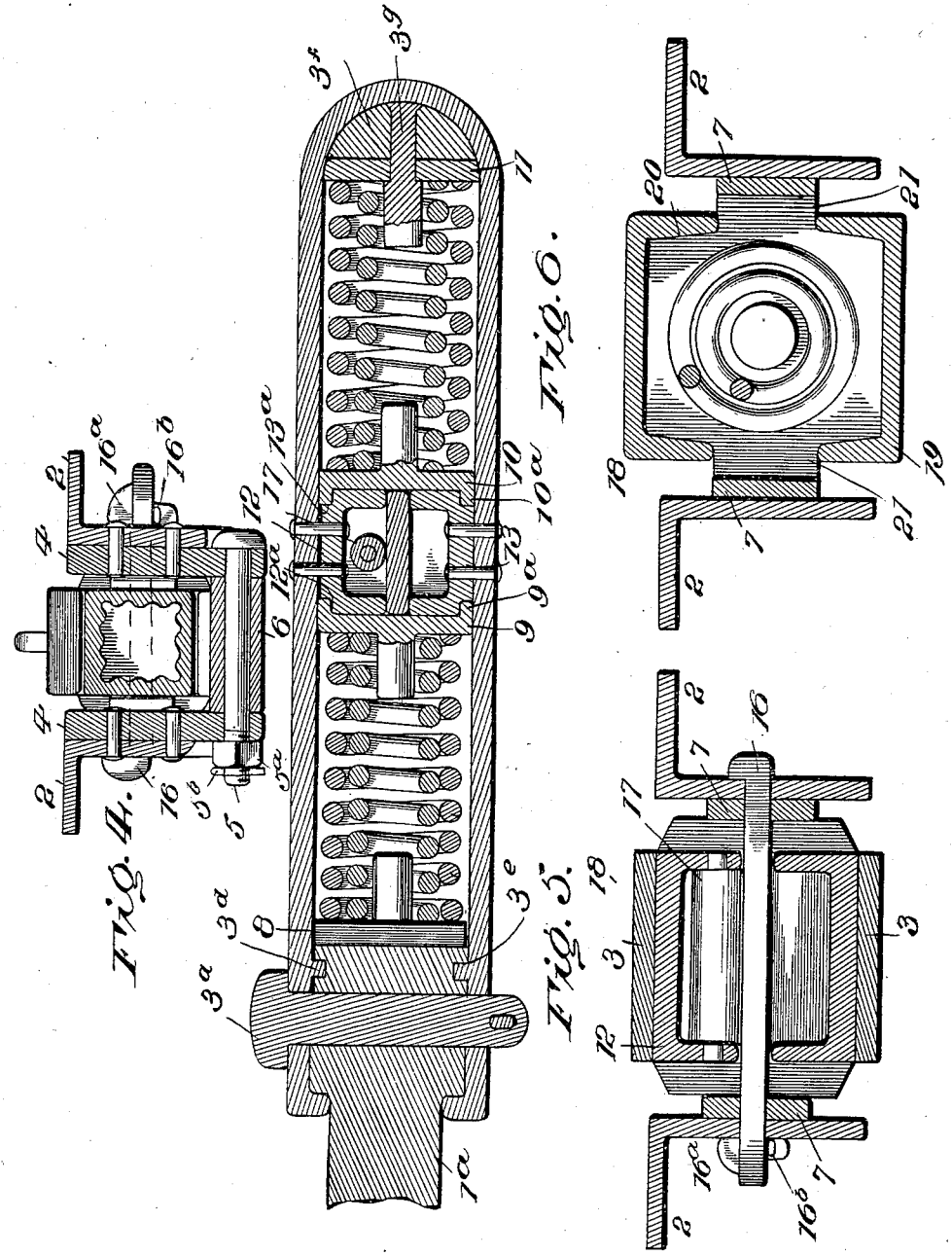

UNITED STATES PATENT OFFICE.

PERRY BROWN, OF WILMINGTON, DELAWARE.

DRAFT MECHANISM.

SPECIFICATION forming part of Letters Patent No. 671,368, dated April 2, 1901.

Application filed January 24, 1900. Serial No. 2,680. (No model.)

*To all whom it may concern:*

Be it known that I, PERRY BROWN, a citizen of the United States, residing at Wilmington, in the county of Newcastle, State of Delaware, have invented a certain new and useful Improvement in Draft Mechanism, of which the following is a specification, reference being had to the accompanying drawings.

This invention relates to an improvement in draft-rigging for cars, and has for its object to provide an extremely simple, durable, and easily adjustable and attached rigging; and with this object in view the invention consists in the peculiar construction, arrangement, and combinations of parts hereinafter more particularly described and then definitely pointed out in the claims at the end hereof.

In the drawings accompanying this specification, Figure 1 is an inverted plan view of a rigging constructed according to my improvement. Fig. 2 is a longitudinal vertical central section of the same. Fig. 3 is a similar section showing the same construction used with a continuous yoke. Fig. 4 is a cross-section through the line $x\,x$ of Fig. 1. Fig. 5 is a sectional view through the line $y\,y$ of Fig. 1, and Fig. 6 is a section of a modification.

Referring now to the details of the drawings by numerals, 1 represents the draw-bar, the shank $1^a$ of which is situated between the draft-beams 2 2 and connected to the straps or yoke 3 by the bolt $3^a$, ribs or lugs $3^d$ being welded to the yoke or strap, which fit into recesses or grooves $3^e$ in the rear end of the shank, and this arrangement greatly strengthens the yoke or strap and prevents its breaking at the point where the bar $3^a$ passes through it. The rear ends of these straps may be connected by the bar $3^b$, as shown in Figs. 1 and 2, or there may be a continuous yoke $3^c$, as shown in Fig. 3, in which case a block $3^f$ has to be provided to fill up the curved end of the yoke, and this block $3^f$ is secured to the rear follower 11, hereinafter described, by the rivet $3^g$, which forms part of a lug entering between the springs.

Riveted to the front ends of the draft-beams are caps 4, (see Figs. 1 and 4,) having perforations therein through which is passed the spindle 5, secured therein by a nut $5^a$ and cotter $5^b$, and supported on said pin so as to rotate thereon is the antifriction-roller 6, arranged to act as a seat for the forward part of the shank of the draw-bar 1 and to allow the latter to move backward and forward thereon with a minimum of friction.

Firmly riveted to the draft-irons 2 2 are the cheek-plates 7 7, provided with the usual stops $7^a\,7^a$, and followers or blocks 8, 9, 10, and 11 are situated within the strap or yoke 3, and those numbered 8 and 10 coact with the stops $7^a\,7^a$, as clearly shown in Fig. 1.

Between the straps or parts of the yoke and firmly riveted thereto are hollow blocks 12 and 13, which are arranged between the two followers 9 and 10 and coact therewith. Studs $12^a$ and $13^a$ project from these blocks and enter perforations in the followers 9 and 10, as shown in Fig. 2.

The usual springs 14 15 are situated between the two sets of followers and act in the ordinary manner.

The draft-irons 2 2 are slotted, as shown in dotted lines in Fig. 1, and through these slots and between the blocks 12 and 13 is passed a flat bar 16, which has no motion with respect to the draft-irons, but is secured therein by the usual key $16^a$ and cotter $16^b$.

In the upper of the two blocks 12 is journaled a roller 17, which, acting on the flat bar 16, prevents wear thereon as the yoke and its connected parts are moved back and forth over it. It is obvious that a similar roller can be placed in the lower block 13; but as almost all of the weight is borne by the upper half of the bar 16 only one roller is actually necessary.

Instead of making the projections $12^a\,13^a$ on the blocks 12 and 13 the followers may be made with lugs or ribs $9^a\,10^a$, as shown in Fig. 3, and fit into corresponding recesses $12^a\,13^a$ in the central blocks.

Instead of using the straps or continuous yoke, as shown in Figs. 1, 2, and 3, I may form those parts of channel-irons 18 19, as clearly shown in Fig. 6, and this form will be decidedly preferable for some forms of riggings. When this form is used, however, the front and rear followers are cut away, as shown at 20 in Fig. 6, and have projecting lugs 21 acting on the cheek-plates 7, hereinbefore mentioned.

It hardly seems necessary to fully describe the operation of my improved rigging, as the devices are so well known now. Hence it will suffice to state that when the draw-bar is subjected to a "pull" the blocks 12 and 13 act on the front spring and compress it against the front follower, which is immovable forwardly, and simultaneously the rear follower 11 is moved forward and compresses its springs against the immovable flat bar 16, while on an "impact" the front follower subjects the front spring to pressure against the immovable flat bar 16, and the follower 10 compresses its springs against the rear follower, which is held from rearward movement by the stops on the cheek-plates.

It is obvious that other changes than those specified can be made without departing from or changing my invention. For instance, the followers 9 and 10, while greatly to be preferred, are not essential and may be entirely omitted, if desired, in which case the flat bar 16 and the blocks 12 and 13 will coöperate directly with the springs. It is also manifest that any arrangement of the front and rear followers 8 and 11 may be used so long as there is some following device between the springs and lugs 7ª 7ª, and where in the following claims I use the term "followers" I intend it to be given this broad construction.

It will be seen that when it is necessary to repair one of my draft-riggings all that is necessary is to remove the flat bar 16 and the spindle 5, when the draw-bar and all of its connected parts can be removed from between the draft-beams.

What I claim as new is—

1. In a draft mechanism; the combination of a draw-bar; a draft-beam on each side thereof; front and rear followers; means for connecting said followers to said draw-bar; a stop or block projecting from said connecting means intermediate of said front and rear followers; a spring between the front follower and said stop or block and a spring between said stop or block and the rear follower; and means as the bar 16 between said springs coacting with the latter and with the aforesaid draft-beams; substantially as described.

2. In a draft mechanism; the combination of a draw-bar; a draft-beam on each side thereof; front and rear followers; means for connecting said followers to said draw-bar; a stop or block projecting from said connecting means intermediate of said front and rear followers; a spring between the front follower and said stop or block and a spring between said stop or block and the rear follower; stops projecting from said draft-beams and coacting with said followers; and means as the bar 16 between said springs coacting with the latter and with the aforesaid draft-beams; substantially as described.

3. In a draft mechanism; the combination of a draw-bar; a draft-beam on each side thereof; front and rear followers; means for connecting said followers to said draw-bar; a stop or block projecting from said connecting means intermediate of said front and rear followers; a spring between the front follower and said stop or block and a spring between said stop or block and the rear follower; cheek-plates secured to said draft-beams; lugs projecting from said cheek-plates and coacting with said followers; and means as the bar 16 between said springs coacting with the latter and with the aforesaid draft-beams; substantially as described.

4. In a draft mechanism; the combination of a draw-bar; a draft-beam on each side thereof; two sets of springs; a follower on each side of each set of springs; means for connecting said followers and springs to said draw-bar; stops projecting from said draft-beams and coacting with the front and rear followers; a stop or block projecting from said connecting means between the two central followers and coacting therewith; and a bar passing from one draft-beam to the other between said central followers; substantially as described.

5. In a draft mechanism; the combination of a draw-bar; a draft-beam on each side thereof; front and rear followers; means for connecting said followers to said draw-bar; a stop or block projecting from said connecting means intermediate of said front and rear followers; a spring between the front follower and said stop or block and a spring between said stop or block and the rear follower; and a bar passing from one draft-beam to the other and between said springs and coacting with the latter; substantially as described.

6. In a draft mechanism; the combination of a draw-bar; a draft-beam on each side thereof; springs arranged behind said draw-bar; means connecting said springs with said draw-bar; and a roller situated within said means and arranged to carry the weight thereof; substantially as described.

7. In a draft mechanism; the combination of a draw-bar; a draft-beam on each side thereof; a strap or yoke connected to said draw-bar; springs within said strap or yoke; means connecting said parts with the draft-beams; and a roller situated within said strap or yoke and bearing on said means; substantially as described.

8. In a draft mechanism; the combination of a draw-bar; a draft-beam on each side thereof; a strap or yoke connected to said draw-bar; springs within said strap or yoke; a block or stop projecting from said strap or yoke between said springs; a roller supported by said block or stop; and a bar connecting said parts with the draft-beams and coacting with said roller and thereby supporting the strap or yoke and its connected parts; substantially as described.

9. In a draft mechanism; the combination of a draw-bar; draft-beams on the side thereof; springs and followers; and channel-irons connecting said springs and followers with said draw-bar; the said springs and followers being situated within the "channels" of said irons; substantially as described.

10. In a draft mechanism; the combination of a draw-bar; draft-beams on the sides thereof; stops projecting from said draft-beams; springs and followers; and channel-irons connecting said springs and followers with said draw-bar; the said springs and followers being situated within the "channels" of said irons and the followers having lugs projecting between the channeled iron and coacting with the stops on said draft-beams; substantially as described.

11. In a draft mechanism; the combination of draft-beams; a draw-bar situated between them; means for connecting said draw-bar with said draft-beams; caps on said draft-beams and lugs projecting from said caps; and an antifriction-roller carried by said lugs and supporting said draw-bar; substantially as described.

12. In a draft mechanism; the combination of draft-beams; a draw-bar; a yoke or straps connected therewith; springs and followers; means coacting with said followers and with said draft-beams; means as the blocks 12 and 13 coacting with said followers; and means as the lugs and recesses located on said followers and second-mentioned means as the blocks 12 and 13 for keeping said parts in their proper relative positions; substantially as described.

13. In a draft mechanism; the combination of draft-beams; a draw-bar; a yoke or strap connected therewith; springs and followers; means coacting with said followers and with said draft-beams; means as the blocks 12 and 13 coacting with said followers; lugs and recesses in said means and followers for keeping them in their proper relative positions; substantially as described.

In testimony whereof I affix my signature, in the presence of two witnesses, this 16th day of January, 1900.

PERRY BROWN.

Witnesses:
J. STEWART RICE,
THOS. E. ROBERTSON.